March 23, 1954 W. E. BRILL 2,672,848
CYLINDER-TO-CRANKCASE BOLTED CONNECTION
Filed July 8, 1952

Inventor
William E. Brill
By Williter, Helwig & Baillio
Attorneys

Patented Mar. 23, 1954

2,672,848

UNITED STATES PATENT OFFICE 2,672,848

CYLINDER-TO-CRANKCASE BOLTED CONNECTION

William Elmer Brill, Cleveland, Ohio, assignor to General Motors Corporation, Detroit, Mich., a corporation of Delaware Application July 8, 1952, Serial No. 297,603

5 Claims. (Cl. 121—194)

This invention relates to threaded fastening devices and has particular application to securing cylinders in place on the crankcase of an internal combustion engine.

In the use of bolts for securing together separable parts subjected to heavy strains such as exist in the case of cylinders attached to an engine crankcase, it has frequently been found preferable to provide the bolt head and the securing nut with spherical seating surfaces in order that the clamping pressures of the bolt heads and nuts on the cylinder and crankcase will be distributed as evenly as possible, thus reducing the tendency for galling and bending stresses in the bolts. Otherwise difficulties are encountered with the bolts loosening and breaking in use.

Such spherical seating bolt heads and nuts, however, present problems in assembly and disassembly, since other means must be provided for rotatively securing either the nut or the bolt tightly against rotation while the other is turned. Accordingly, one of the principal objects of my present invention is to provide an improved means for rotatively securing the head of such a bolt in an engine crankcase or the like which enables taking full advantage of the spherical seating qualities without effectively weakening either the bolt or the crankcase with which it is associated.

In using bolts to secure cylinders and like members in place on one side of a relatively large member such as an engine crankcase or other hollow housing, it often becomes a problem to retain the head of the bolt seated in place while the other member to be mounted thereon is being removed or installed, the bolt tending to drop by gravity or be pushed out of place in the process. Another object of this invention, therefore, is to provide a bolt retaining means which is not only effective to prevent axial rotation of the bolt, but will also serve to thrustably support it in place when the securing nut is removed.

Other objects and advantages of this invention will be apparent to those skilled in the art upon a reading of the following detailed description of an illustrative embodiment thereof, having reference to the drawing wherein.

Figure 1:
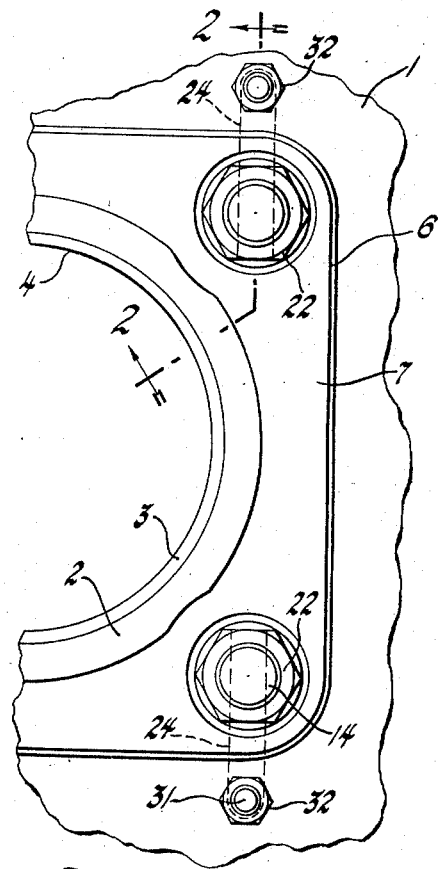
Figure 1 is a fragmentary plan view of an internal combustion engine crankcase cylinder secured together by the bolted mounting arrangement of my invention.
Figure 2:
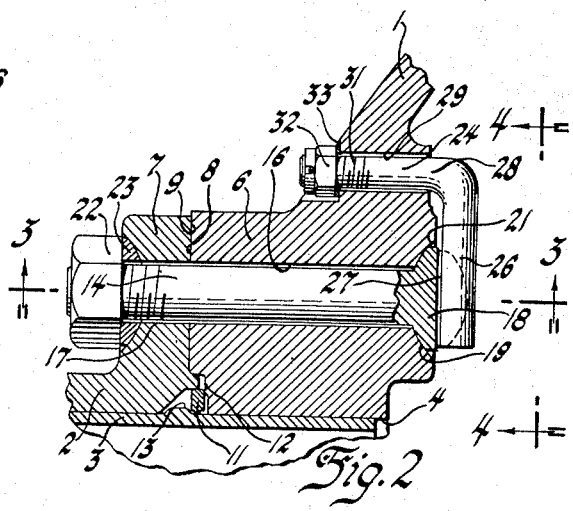
Figure 2 is a sectional view taken substantially on line 2—2 of Figure 1.
Figure 3:
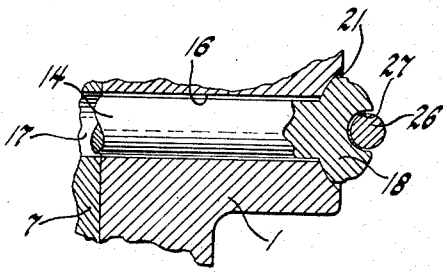
Figure 3 is a sectional view taken substantially on line 3—3 of Figure 2.
Figure 4:
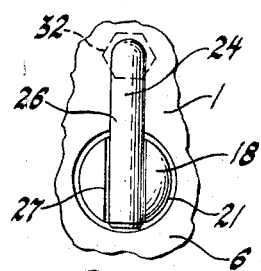
Figure 4 is a bottom plan view of my bolted mounting as taken from line 4—4 of Figure 2.

Referring now in detail to the drawing, the number 1 indicates a portion of a crankcase wall of an internal combustion engine having a cylinder 2 secured thereto, the internal periphery of which cylinder is fitted with the usual cylinder liner 3 whose lower end may, as shown, extend a distance into cylinder port opening 4 of the crankcase. Surrounding the opening 4, the crankcase is provided with the usual cylinder mounting boss 6, and the lower end of the cylinder 2 is externally flanged as at 7 and abuts the boss 6. The opposing faces 8 and 9 of the cylinder flange 7 and crankcase boss 6 are shown relieved adjacent their inner margins to receive an angular ring 11 which rests adjacent its outer periphery on a shoulder 12 of the crankcase and serves to support the liner 3 which has a small external flange 13 resting on the upper surface of the ring adjacent its inner periphery. The upper end of the liner abuts a shoulder (not shown) formed on the inner periphery of the cylinder wall, and thus the liner is held downwardly against the ring 11 when the cylinder and crankcase faces are clamped together.

The means for effecting this clamping engagement of the cylinder flange and crankcase boss is in the form of a threaded bolt 14 passing through aligned apertures 16 and 17 provided in the boss 6 and flange 7 respectively. The lower end of the bolt has the underside of its head 18 provided with a spherical seating surface 19 which sockets in a cooperating recess 21 formed on the inner surface of the crankcase boss 6. The outer end of the bolt 14 is threadedly engaged by a nut 22, and between this nut and the cylinder flange 7 is a washer 23 having its inner face spherically shaped to socket in a correspondingly spherical recess provided in the upper surface of the cylinder flange 7. The separate nut and washer construction described may be modified by making these two parts integral, in which case the lower clamping face of the nut 22 will be spherically shaped and fit directly in the recess or socket provided in the cylinder flange 7. A plurality of such bolts and nuts are used and are spaced circumferentially about the cylinder 2, the number required being a matter of choice and design.

The construction thus far described is conventional and forms no part of the present invention.

To secure bolt 14 from rotation during installation and removal of the nut 22 and also to maintain the bolt head 18 properly seated in the recess 21 of the crankcase when the nut is removed there is provided a bolt locking device in the form of an L-shaped member 24. One leg 26 of this member, as shown, extends transversely of and underlies the bolt head 18 which is provided with a transverse groove 27 of sufficient width and depth to receive and afford a positive engagement with the leg 26. The other leg 28 of the member 24 is turned outwardly of the crankcase in a direction parallel with the axis of the bolt 14 and extends through a passage 29 provided in the crankcase for that purpose. Means are provided on the outer end of leg 28 such as threads 31 and a securing nut 32 for drawing the member 24 axially on its leg 28 to bring and maintain the leg 26 in interengagement with the bolt head groove 27. A suitable abutment surface for the nut 32 is provided on the crankcase in the form of a boss or (as shown) face 33 recessed into the outer wall of the crankcase.

The arrangement of the member 28 with its leg 26 interengaging the bolt head groove 27 and its leg 28 separately secured to the crankcase, as described, provides a very simple and convenient means for anchoring the cylinder hold-down bolt 14 in place both longitudinally and rotatively in the crankcase. Further, it enables taking full advantage of the use of the spherical seating surfaces of the bolts and nuts, and enables the proper tensioning of these bolts without interference from the bolt locking means. The parts necessary to accomplish this result are simple and economical to manufacture, and enable all operations in the removal of the engine cylinder to be performed exteriorly of the crankcase, yet may readily be removed to permit replacement of a broken or damaged cylinder hold-down bolt when such is necessary.

I claim:

1. In combination, a bolt having a head adapted to rotatively bear against a member to be secured by the bolt, said head having its surface remotely opposite the shank of the bolt provided with an external transversely extending groove and an L-shaped bolt retaining member having one leg of the L receivable by said groove and its other leg adapted to extend through said member in spaced parallel relation with said bolt.

2. In combination with two members secured together by a threaded element extending through at least one of the members and having a head generally spherically seated in said one member, said head having a transverse groove formed therein in oppositely presenting relation from said one member, a second threaded element extending through one of the members and having a transversely extending portion fitting said groove, and a nut on said second element and seating on said last named member for retaining said portion in said groove.

3. In a bolted mounting of a cylinder to an engine crankcase, a crankcase and a cylinder having aligned bolt openings extending therethrough, a bolt extending through said openings and terminating at one end in a head, said crankcase having a second opening extending therethrough laterally spaced from said bolt, and a generally L-shaped member having one leg of the L extending through said second opening and the other leg of the L extending transversely of the bolt, said bolt head and said other leg being in direct interengaging relation with each other whereby axial rotation of said bolt is restrained by said member.

4. In a cylinder-to-crankcase mounting for an internal combustion engine or the like, a crankcase having a cylinder mounting boss, a cylinder having a crankcase mounting flange, said boss and flange having aligned bolt openings, a bolt extending through said openings and having a head abutting and rotatably bearing against said boss interiorly of the crankcase, said head being provided with a transverse groove facing inwardly of the crankcase, an L-shaped bolt retainer having one leg engaged by said groove and another leg extending through the crankcase in parallel laterally spaced relation to said bolt, said other leg terminating exteriorly of the crankcase with an externally threaded portion, and a nut threadedly receiving said portion and seated on the crankcase adjacent said cylinder flange.

5. In a cylinder-to-crankcase mounting wherein abutting portions of the cylinder and crankcase are held clamped together by bolts which extend through said portions and have their heads rotatably seating on the inner surface of the crankcase opposite said portions, releasable means for locking said bolt against axial rotation and for preventing its disassembly from the crankcase, said means comprising a groove on the face of the bolt head disposed inwardly of the crankcase, a member having two angularly disposed legs, one of said legs extending through the crankcase adjacent said bolt, retaining means on said one leg exteriorly of and engaged by the crankcase, the other of said legs being longitudinally embraced by said groove and held in place therein by said engagement of the retaining means with the crankcase.

WILLIAM ELMER BRILL.

References Cited in the file of this patent

UNITED STATES PATENTS

| Number | Name | Date |
| --- | --- | --- |
| 828,303 | Clauss | Aug. 14, 1906 |
| 1,552,702 | Irish | Sept. 8, 1925 |
| 1,677,607 | Wood | July 17, 1928 |
| 2,266,852 | Cunningham | Dec. 23, 1941 |
| 2,558,814 | Briney | July 3, 1951 |